June 17, 1930.  C. A. SIGNELL ET AL  1,764,989

DRILL

Filed March 14, 1927

INVENTORS:
C. A. Signell and
Otto Signell
ATTORNEY.

Patented June 17, 1930

1,764,989

UNITED STATES PATENT OFFICE

CARL A. SIGNELL AND OTTO SIGNELL, OF JAMESTOWN, NEW YORK

DRILL

Application filed March 14, 1927. Serial No. 175,244.

This invention relates to improvements in drills for work in stone although they may be employed for other purposes. One object is to provide a drill that is of simple construction, very durable and that attains the maximum efficiency in use.

With the foregoing and other objects in view the invention consists in the combination and arrangement of parts to be hereinafter fully described, pointed out in the appended claim and illustrated in the accompanying drawing which forms a part of this application and in which—

Like reference characters denote corresponding parts in both views.

Figure 1:
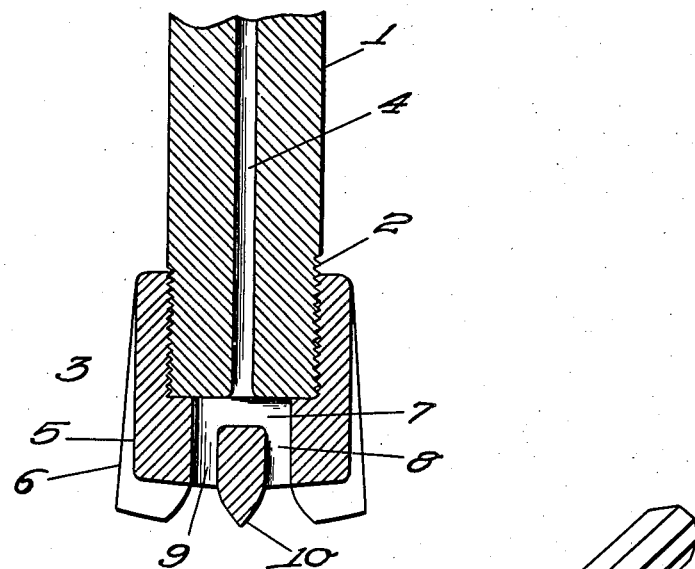
Fig. 1 is an enlarged fragmentary sectional view of the drill shown in Fig. 2.
Figure 2:
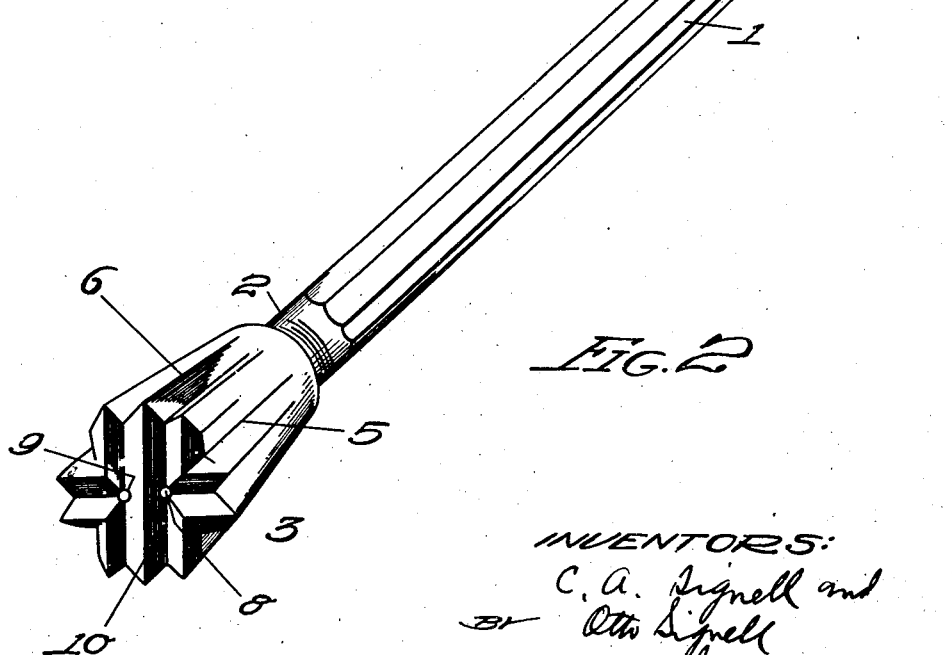
Fig. 2 is a perspective view of the drill.

Drills of this nature which are designed for heavy work must necessarily be made of the best tool steel which is very expensive, and in the ordinary one-piece drill it is necessary to discard the complete tool if any part thereof is worn excessively or broken. The present tool is designed with a separable head which, when worn, may be discarded for a new one which may be fitted to the same shank thus greatly prolonging the life of the shank portion of the tool thus greatly reducing the cost of tools employed in this work.

The reference numeral 1 denotes the shank of the tool having the threaded, non-fluted end 2 adapted to receive the interiorly threaded hollow head 3. A centrally disposed bore 4 extends longitudinally of the shank from end to end.

The head 3 is formed with a plurality of recesses 5 the depth of which increases as the recesses recede from the upper or interiorly threaded end of the tool and the ridges 6 between the recesses are bevelled slightly from their lower to their upper ends.

The head is formed interiorly with a passageway 7 that registers with the bore 4 in the shank and with branch passageways 8, 9 that extend to the cutting end of the head. Transverse cutting edges 10, 11, 12, 13, 14 are formed upon the free or working end of the head, one only of said cutting edges, 10, extending diametrically across the end of said head and being spaced by parallel grooves 15, 16 from the remaining cutting edges. The cutting edges 13, 14 are separated by radial grooves 17, 18 and divided by said grooves and the grooves 15, 16 into a plurality of groups, each group comprising cutting edges 11, 14; or 12, 14; or 11, 13; or 12, 13, and the cutting edges of each group being disposed at right angles to each other.

In use the tool is supplied with water which passes through the bore 4 of the shank and then through the pasageways 7, 8, 9 upon the work. The chips, dust, etc. resulting from the operation of the tool will pass up through the recesses 5 and will not block or obstruct the water passages. This is a very important feature of the head as the stoppage of these passages impairs the efficiency of the tool.

What is claimed is:—

In a drill, a shank having a longitudinal central bore, a head adapted for removable attachment to one end of said shank, said head having a recessed periphery, the depth of said recesses being greater at one end than at the other, the ribs between said recesses being bevelled from the outer to the inner end of said head, cutting edges formed upon the outer end of said head, one only of said cutting edges extending diametrically of said head and being spaced by parallel grooves from all of the remaining cutting edges, the said remaining cutting edges being separated by radial grooves into a plurality of groups, the cutting edges of each group being angularly disposed with relation to each other, and intercommunicating water passageways in said head communicating with the bore in said shank.

In testimony that we claim the foregoing as our own we have hereto affixed our signatures.

CARL A. SIGNELL.
OTTO SIGNELL.